Nov. 2, 1926.  
C. W. CAMPBELL  
1,605,391  
REDUCING SHELL FOR CAVITY MOLDS  
Filed March 13, 1926
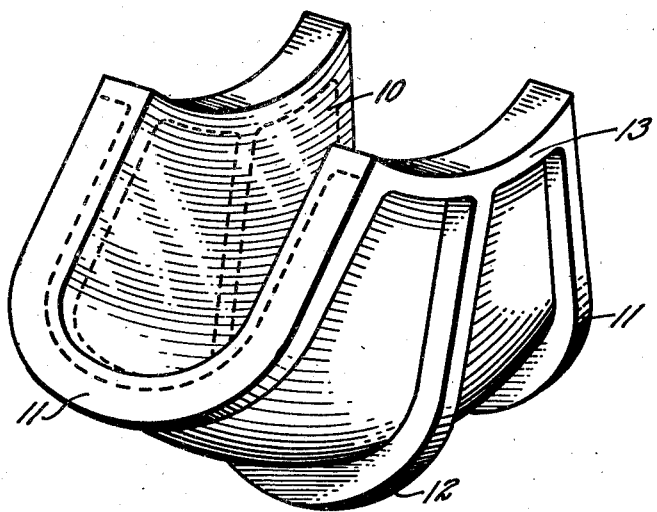
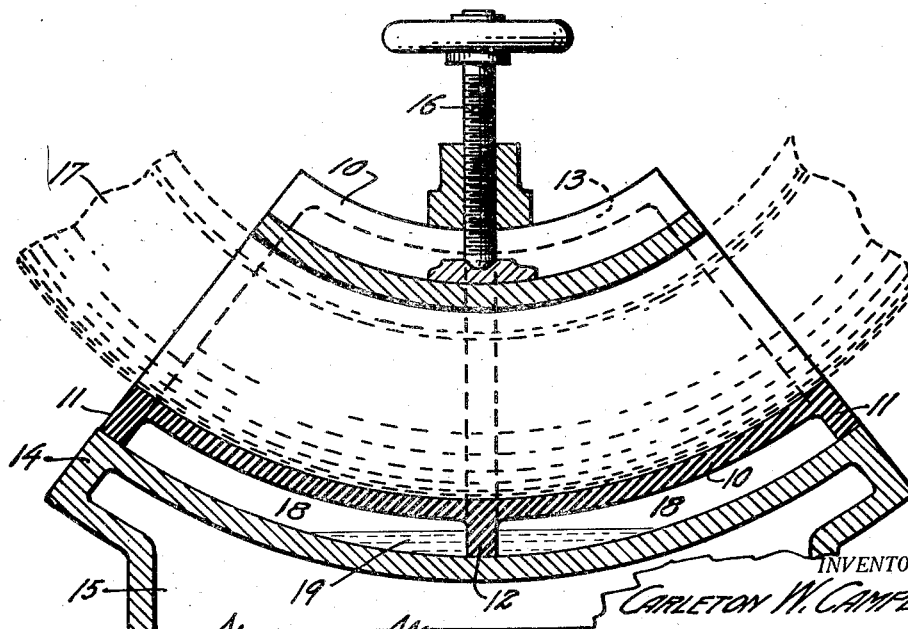
INVENTOR.  
CARLETON W. CAMPBELL  
BY  
ATTORNEY.

Patented Nov. 2, 1926.

1,605,391

UNITED STATES PATENT OFFICE.

CARLETON W. CAMPBELL, OF DENVER, COLORADO, ASSIGNOR TO MOLL MANUFACTURING COMPANY, OF DENVER, COLORADO.

REDUCING SHELL FOR CAVITY MOLDS.

Application filed March 13, 1926. Serial No. 94,427.

This invention relates to cavity molds for vulcanizing pneumatic tire casings and more particularly to reducing shells for placing within the cavity of the mold to reduce its size so as to accommodate smaller casings.

It is the present custom to construct these reducing shells of solid metal, and, when so constructed, especially when reducing the size of the mold considerably, they are very heavy and require considerable time before they will attain the temperature of the mold. It is also necessary, with the solid construction, to machine the entire outer surface of the reducing shell so that it will form a substantially perfect contact with the inner face of the mold.

The principal object of this invention is to overcome the above objections to the present shells and construct a reducing shell that will be light in weight, economical to manufacture, and which will quickly attain the temperature of the mold.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of my improved reducing shell.

Fig. 2 is a vertical longitudinal section through a cavity mold, illustrating the shell in place.

The invention comprises a shell wall 10, the inner surface of which is shaped to conform to the size of tire casing intended to be vulcanized. The outer surface of the wall 10 carries a series of radial ribs 11 and 12, the ribs 11 forming flanged ends upon the shell and the rib 12 acting as a reinforcement for the mid-portion of the shell. A third rib 13 follows the contour of the top of the shell 10. The face of each of these ribs is machined so as to form a substantially perfect contact with the inner face of a cavity mold, such as illustrated at 14, Fig. 2.

In Fig. 2, the steam compartment of the cavity mold 14 is shown at 15 and the casing clamp at 16. When in place in the mold cavity, air chambers 18 will be formed between the shell 10, the cavity wall and the ribs 11, 12 and 13, the shell contacting with the cavity only at the ribs.

It can be readily seen that by this construction, more than fifty per cent of the metal usually employed has been eliminated and the labor involved, in machining the entire outer surface of the shell, has been tremendously reduced since it is only necessary now to machine the faces of the ribs. Since there is less than one half the usual metal to be heated, the shell will attain the same temperature as the mold in substantially one half the time required by the present shells.

It has been found by actual experiment that it requires much less than one half the time to heat the shell, probably owing to the fact that convection air currents act between the heated mold face and the cold shell to quickly transmit the heat from the mold to the shell.

In practice, it has been found that the shell can be more quickly brought to the desired temperature if a cupful of water is placed in the mold, as indicated at 19, before the shell is put in place. This water is quickly vaporized and fills the chambers 18 with steam. The shells may be made to reduce the cavity size to any desired diameter without changing the thickness of the shell wall.

While a specific form of the improvement has been described and illustrated herein, it is desired to be understood that the same may be varied, within the scope of the appended claims, without departing from the spirit of the invention.

Having thus described the invention, what I claim and desire to secure by Letters Patent is:—

1. A reducing shell for cavity molds having projections arranged to space the shell proper away from the surface of the mold.

2. A reducing shell for cavity molds having ribs arranged to space the shell proper from the surface of the mold.

3. A reducing shell for cavity molds comprising, a shell wall of smaller size but having a contour similar to that of the mold; flanges surrounding the outline of said wall and arranged to maintain said wall spaced from said mold.

4. A reducing shell for cavity molds comprising, an arcuately formed U-shaped shell; radially arranged ribs surrounding said shell; and a peripheral rib co-acting with said radial ribs to form chambers between said mold and said shell, when the latter is in position in said mold.

In testimony whereof I affix my signature.

CARLETON W. CAMPBELL.